(12) United States Patent
Takagi

(10) Patent No.: US 7,854,450 B2
(45) Date of Patent: Dec. 21, 2010

(54) TUBE FIXING STRUCTURE AND FIXING MEMBER USED THEREFOR

(75) Inventor: Osamu Takagi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 341 days.

(21) Appl. No.: 10/948,282

(22) Filed: Sep. 24, 2004

(65) Prior Publication Data

US 2005/0110272 A1 May 26, 2005

(30) Foreign Application Priority Data

Sep. 29, 2003 (JP) ............. 2003-336679

(51) Int. Cl.
*F16L 33/00* (2006.01)

(52) U.S. Cl. .............. 285/242; 285/244; 285/308; 285/317

(58) Field of Classification Search ............. 285/242, 285/417, 419, 420, 38, 244, 308, 317; 24/545, 24/546, 327, 339, 910, 22, DIG. 29, 16 R
See application file for complete search history.

(56) References Cited

U.S. PATENT DOCUMENTS

| | | | | |
|---|---|---|---|---|
| 590,094 A * | 9/1897 | Duncan | .............. | 24/20 S |
| 884,256 A * | 4/1908 | Addie | .............. | 248/229.26 |
| 2,316,724 A * | 4/1943 | Sperry | .............. | 4/288 |
| 3,158,388 A * | 11/1964 | Marshall | .............. | 285/90 |
| 3,388,227 A * | 6/1968 | Basso et al. | .............. | 200/296 |
| 3,572,428 A * | 3/1971 | Monaco | .............. | 165/80.3 |
| 3,845,521 A * | 11/1974 | McNichol | .............. | 24/67.9 |
| 4,020,530 A | 5/1977 | Sartore | | |
| 4,425,682 A | 1/1984 | Hashimoto et al. | | |
| 4,471,512 A | 9/1984 | Thalenfeld | | |
| 4,993,756 A * | 2/1991 | Bechu | .............. | 285/319 |
| 5,141,497 A * | 8/1992 | Erskine | .............. | 604/164.05 |
| 5,417,460 A * | 5/1995 | Lunder | .............. | 285/253 |
| 5,473,796 A * | 12/1995 | Fusillo | .............. | 24/30.5 R |
| 6,003,211 A * | 12/1999 | Chen | .............. | 24/545 |
| 6,523,231 B1 * | 2/2003 | Lassiter | .............. | 24/339 |
| 6,942,532 B2 * | 9/2005 | Snyder | .............. | 441/75 |
| 2003/0048336 A1 | 3/2003 | Kaga et al. | | |

FOREIGN PATENT DOCUMENTS

| | | |
|---|---|---|
| EP | 0 228 325 A1 | 7/1987 |
| EP | 0 302 135 A1 | 2/1989 |
| FR | 658163 A | 5/1929 |

(Continued)

*Primary Examiner*—Aaron Dunwoody
*Assistant Examiner*—Fannie Kee
(74) *Attorney, Agent, or Firm*—Oliff & Berridge, PLC

(57) ABSTRACT

In a tube fixing structure, a tube is fixed to a joint by means of a fixing member. The joint comprises a pipe whose one end is fitted into the tube, whose outside diameter is larger than an inside diameter of the tube, and whose outer surface is flattened with respect to the axial direction; and a main body that is connected with the other end of the pipe. The fixing member comprises a cylindrical holder made of a flexible material, which holds a portion of the tube having the pipe fitted therein by cramping the portion from its outer periphery, the holder having a through hole into which the tube is coaxially disposed and a slit formed to reach the through hole.

15 Claims, 16 Drawing Sheets

FOREIGN PATENT DOCUMENTS

| | | | |
|---|---|---|---|
| FR | 1427457 A | 4/1966 |
| GB | 101257 A | 8/1916 |
| JP | U-51-161343 | 12/1976 |
| JP | U-55-76176 | 6/1980 |
| JP | U-60-143986 | 9/1985 |
| JP | A-2-118297 | 5/1990 |
| JP | U-5-34387 | 5/1993 |
| JP | A-5-270188 | 10/1993 |
| JP | A-10-231977 | 9/1998 |
| JP | A 2003-080725 | 3/2003 |

\* cited by examiner

TUBE FIXING STRUCTURE AND FIXING MEMBER USED THEREFOR

BACKGROUND OF THE INVENTION

1. Field of the Invention

The present invention relates to a structure for fixing a tube to a joint, and also to a fixing member used in this structure.

2. Description of Related Art

In an ink-jet head that performs a recording by ejecting ink onto a record medium, according to a known technique, an ink supply source such as ink tank supplies ink via a tube (see U.S. Patent Publication No. 2003/0048336A1). The head according to this technique includes therein an air trap unit and a joint. The air trap unit accommodates air bubbles generated in the tube. The joint is disposed between the air trap unit and the tube, and connects them. A connector for connecting the joint with the tube is provided at one end of the joint opposite to the air trap, to protrude therefrom. The connector is made up of a tapered head and a neck. A maximum diameter of the head is larger than an inside diameter of the tube, and the head has its diameter decreasing toward a tip thereof. The neck has a small diameter and continuously extends from a maximum-diameter portion of the head. When one end of the tube is attached to the connector, the maximum-diameter portion of the head of the connector is in close contact with an inner surface of the tube, and therefore the diameter of the tube is decreased at the tip of the head and at the neck. Further, the portion of the tube having the connecter fitted therein is cramped from its outer periphery by means of a cylindrical fixing member, so that the tube can surely be fixed to the joint.

SUMMARY OF THE INVENTION

Although the aforementioned technique adopts a flexible tube, a rigid tube having vapor permeability and gas permeability may sometimes be adopted in order to prevent vaporization of moisture of ink contained in the tube and also to prevent entry of air from outside into the tube. In this case, the tube may incur plastic deformation and cause creeps or scratches at the time of being attached to the connector, because an outer surface of the connector of the joint is uneven. A tube having creeps or scratches would be significantly deteriorated in airtightness and stability. Even if creeps or scratches are not caused, the tube incurs plastic deformation and therefore repetitive attachment/detachment of the tube to/from the joint is disadvantageously affects airtightness and stability of the tube.

An object of the present invention is to provide a tube fixing structure capable of maintaining good airtightness and stability even when a rigid tube is adopted, and also to provide a fixing member used for the tube fixing structure.

According to an aspect of the present invention, there is provided a tube fixing structure in which a tube is fixed to a joint by means of a fixing member. The joint comprises a pipe whose one end is fitted into the tube, whose outside diameter is larger than an inside diameter of the tube, and whose outer surface is flattened with respect to the axial direction; and a main body that is connected with the other end of the pipe. The fixing member comprises a cylindrical holder made of a flexible material, which holds a portion of the tube having the pipe fitted therein by cramping the portion from its outer periphery, the holder having a through hole into which the tube is coaxially disposed and a slit formed to reach the through hole.

According to the aforementioned aspect, the outer surface of the pipe of the joint is flattened with respect to its axial direction. Therefore, even when a rigid tube is adopted, the tube exhibits no excessive deformation and thus airtightness and stability of the tube can be kept well. In addition, since deformation of the tube is suppressed, repetitive attachment/detachment of the tube to/from the joint does not deteriorate the airtightness and stability of the tube. Therefore, excellent maintenability can be obtained. Further, when the tube is held by the holder of the fixing member, the slit is expanded in accordance with the rigidity of the tube and then the tube disposed within the through hole receives appropriate cramping force. This can surely fix the tube to the joint.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

In the following, a certain preferred embodiment of the present invention will be described in conjunction with the accompanying drawings.

First, referring to FIG. 1, a description will be given to a general construction of an ink-jet printer that adopts a tube fixing structure according to a first embodiment of the present invention. An ink-jet printer 101 of this embodiment is a color printer having four ink-jet heads 1. The printer 101 includes a paper feed unit 111 (as shown lefthand in FIG. 1) and a paper discharge unit 112 (as shown righthand in FIG. 1). Within the printer 101, formed is a paper conveyance path running from the paper feed unit 111 to the paper discharge unit 112.

Figure 1:
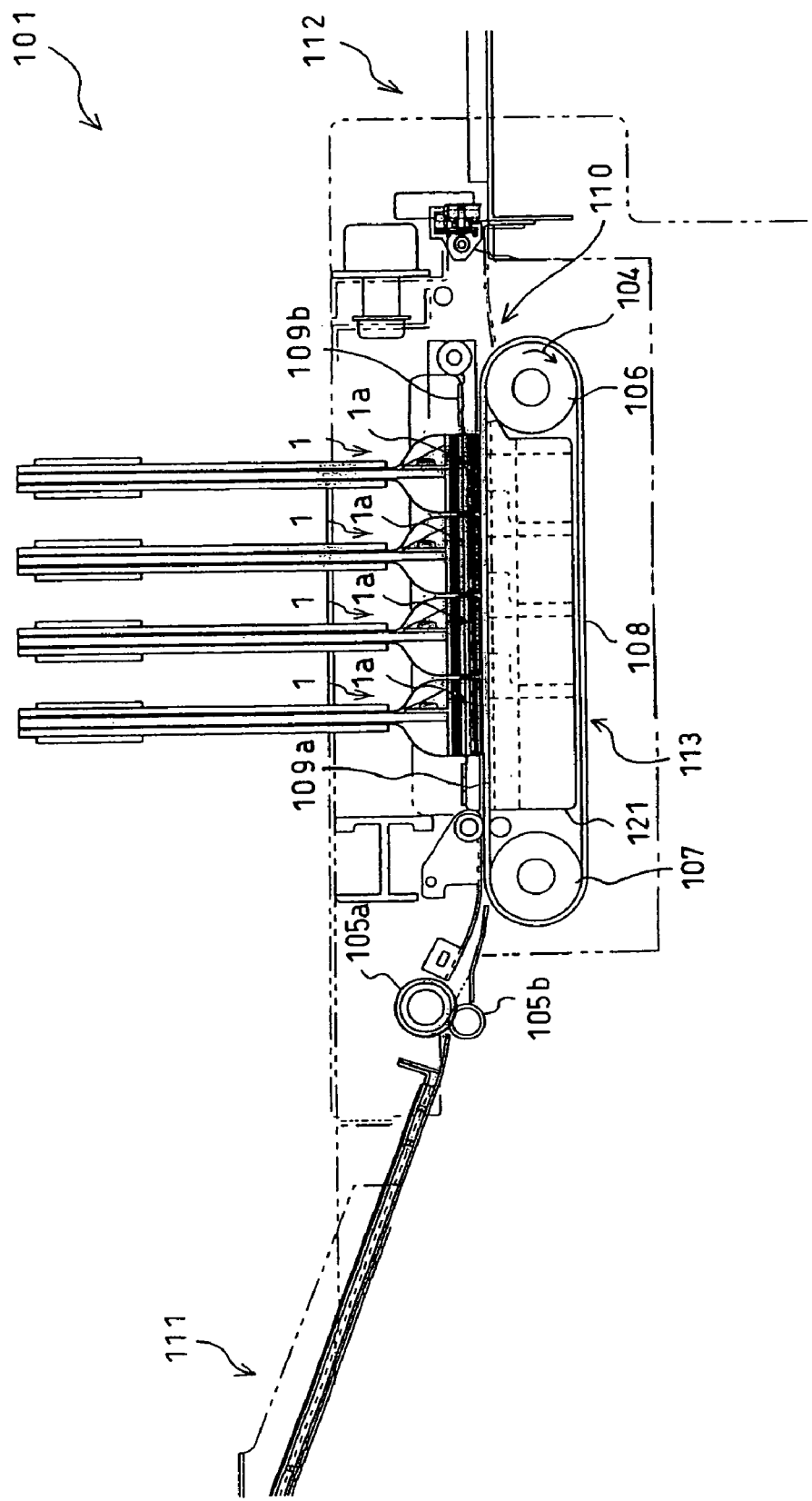
FIG. 1 illustrates a general construction of an ink-jet printer that adopts a tube fixing structure according to a first embodiment of the present invention.

A pair of paper feed rollers 105a and 105b are disposed immediately downstream from the paper feed unit 111, so that the rollers 105a and 105b can pinch a paper as a record medium which is in this condition conveyed from left to right in FIG. 1. In a middle of the paper conveyance path and below the four heads 1, a conveyance unit 113 is provided in confrontation with the four heads 1. The conveyance unit 113 has two rollers 106 and 107, and a looped conveyor belt 108 that is wound on the rollers 106 and 107 to be stretched between them.

The conveyor belt 108 has a two-layered structure made up of a silicone rubber and a polyester-base body impregnated with urethane. The silicone rubber is adopted to form an outer face, i.e., a conveyor face of the conveyor belt 108. A paper fed through the pair of paper feed rollers 105a and 105b is pressed on the conveyor face of the conveyor belt 108 to thereby be held onto the conveyor face by adhesive power, and in this condition conveyed downstream, i.e., rightward in FIG. 1 in association with clockwise rotation (rotation in a direction of the arrow 104) of one roller 106.

Pressing members 109a and 109b are provided at a position where a paper is fed onto the conveyor belt 108 and a position where a paper is discharged from the conveyor belt 108, respectively. The pressing members 109a and 109b serve to press a paper onto the conveyor face of the conveyor belt 108 in order to prevent a separation of the paper from the conveyor face. Thereby, the paper can surely be held on the conveyor face to be conveyed on.

A peeling plate 110 is provided immediately downstream (rightward in FIG. 1) from the conveyor belt 108. The peeling plate 110 peels off a paper, which is held on the conveyor face of the conveyor belt 108 by adhesive power, from the conveyor face so that the paper can be transferred toward the paper discharge unit 112.

The four ink-jet heads 1 are arranged in parallel along a paper conveyance direction, and each ink-jet head 1 has, at its lower end, a head main body 1a. Each head main body 1a has a rectangular shape when sectioned along a plane that is parallel to the conveyor face. The head main bodies 1a are arranged close to one another with a longitudinal axis of each head main body 1a extending perpendicularly to the paper conveyance direction, i.e., perpendicularly to the drawing sheet of FIG. 1. That is, the printer 101 is of line type. Bottom faces of the respective four head main bodies 1a confront the paper conveyance path, and a large number of small-diameter nozzles (not illustrated) are arranged on the bottom faces of the four head main bodies 1a. Ejected from the bottom faces of the four head main bodies 1a are magenta ink, yellow ink, cyan ink, and black ink, respectively.

Between the conveyor face of the conveyor belt 108 and the bottom faces of the head main bodies 1a, is formed a narrow clearance, through which the paper conveyance path is formed. With this construction, while a paper, which is being conveyed by the conveyor belt 108, passes immediately under the four head main bodies 1a in order, the respective color inks are ejected through the corresponding nozzles toward an upper face, i.e., a print face of the paper to thereby form a desired color image on the paper.

In a space enclosed by the conveyor belt 108, a nearly rectangular parallelepiped guide 121 is disposed to be opposed to the ink-jet heads 1. The guide 121 is in contact with an inner face of an upper-located part of the conveyor belt 108 to thereby support the upper-located part from an inside. The guide 121 and the conveyor belt 108 have substantially the same width.

Next, referring to FIG. 2, a description will be given to a system for supplying ink to the ink-jet heads 1 illustrated in FIG. 1.

Figure 2:
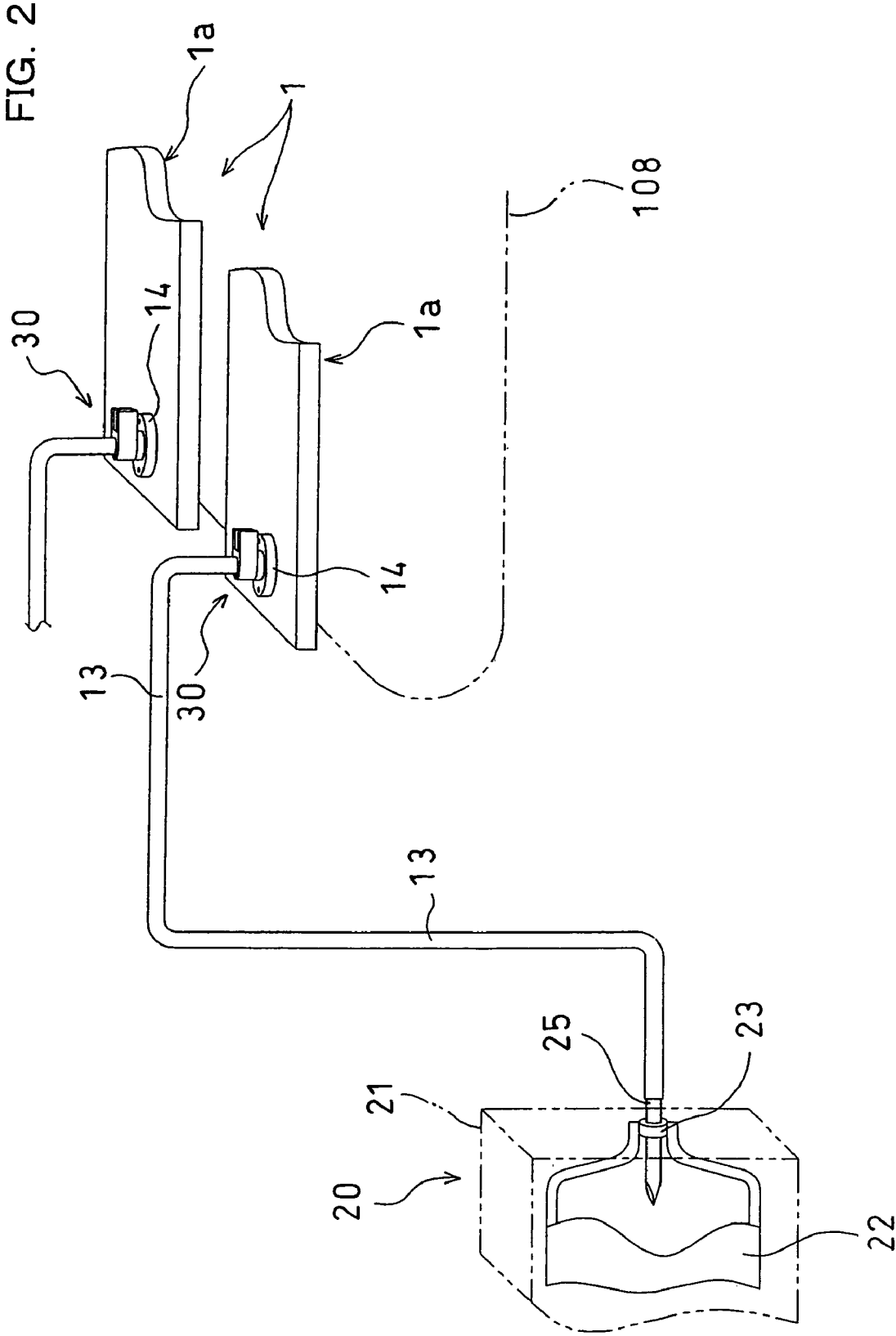
FIG. 2 schematically illustrates a system for supplying ink to an ink-jet head illustrated in FIG. 1.

The printer 101 includes therein four ink tanks 20 (only one of which is shown in FIG. 2) that are detachably mounted. The four ink tanks 20 correspond to the respective for four heads 1, and contain different colors of ink from one another. The ink tanks 20 are disposed behind the conveyor belt 108 in a direction perpendicular to the drawing sheet of FIG. 1. Each ink tank 20 is connected to the corresponding head 1 via a cylindrical tube 13. Ink contained in the ink tank 20 is introduced via the tube into an ink passage formed within the head main body 1a, and then ejected through the nozzles.

The ink tank 20 includes a housing 21 made of a synthetic resin, and an ink bag 22 disposed within the housing 21. The ink bag 22 is made of a pouch film that has been obtained by thermocompression-bonding a plurality of flexible films. The ink bag 22 contains deaerated ink. The pouch film has a layered structure made up of, from inside to outside, an innermost polypropylene layer, a polyester layer as a base material, an aluminum-foil layer having a gas barrier function, and a nylon layer for improving strength. A cap 23 made of a silicone rubber or a butyl rubber seals an opening of the ink bag 22.

A hollow needle 25 connected with one end of the tube 13 is pierced through the cap 23. In order to renew the ink cartridge 20, the hollow needle 25 is pulled away from the cap 23 so that the ink cartridge 20 can be separated from the tube 13.

The tube 13 has a three-layered structure made up of an inner layer, an outer layer, and an intermediate layer disposed between the inner layer and the outer layer. The intermediate layer is made of a resin having very low vapor-permeability and very low gas-permeability, such as an ethylene vinyl alcohol (EVOH) resin. The inner and outer layers are made of a high-density polyethylene resin, and bonded to the intermediate layer with an adhesive. The tube 13 having such a structure can prevent vaporization of moisture of ink contained therein and also can prevent entry of air from outside into the tube 13. The tube 13 is a rigid tube having barely enough flexibility to satisfy bending durability required in the ink-jet printer 101. An inside diameter of the tube 13 is 3 mm, and an outside diameter thereof is 4 mm.

A base end of the hollow needle 25 is inserted into one end of the tube 13. The hollow needle 25 is made of a metal, and has a cylindrical shape. A tip of the hollow needle 25 has an obliquely cut, sharpened shape, and is pierced through the cap 23 of the ink tank 20. Ink contained in the ink bag 22 of the ink tank 20 flows through the hollow needle 25, and then introduced into the tube 13.

Each head main body 1a is provided, on its upper face, with a joint 14 that is mounted near one longitudinal end of the upper face. The other end of the tube 13 is fixed to the joint 14 with a fixing member 30.

Next, referring to FIG. 3, the joint 14 will be described.

The joint 14 comprises a main body 15 disposed on the upper face of the head main body 1a, a protrusion 16 protruding upward from substantially a center of the main body 15, a through hole 17 formed vertically through substantially the center of the main body 15 and the protrusion 16, and a pipe 18 inserted into the through hole 17 to extend in the vertical direction.

The main body 15 is made of a polyoxymethylene (POM) resin, and has an elliptic shape in a plan view. The main body 15 has two through holes 15a formed therethrough in its thickness direction. By inserting screws in the through holes 15a, the joint 14 can be fixed to the head main body 1a. The protrusion 16 is formed integral with the main body 15, and, similarly to the main body 15, made of a POM resin. An outside diameter of the protrusion 16 is substantially the same as an outside diameter of a later-detailed holder 31.

The pipe 18 is made of a metal such as stainless steel, and, similarly to the tube 13, has a cylindrical shape. An outer surface of the pipe is even, and flattened in its axial direction. One end 18a of the pipe 18 is located above the protrusion 16, and the other end 18b is located within the through hole 17. The one end 18a is fitted into the tube 13. An inside diameter and an outside diameter of the pipe 18 are constant throughout its entire length. The outside diameter of the pipe is 3.2 mm, which is slightly larger than the inside diameter of the tube (i.e., 3 mm).

Next, referring to FIGS. 3, 4, 5A, and 5B, the fixing member 30 will be described.

Figure 3:
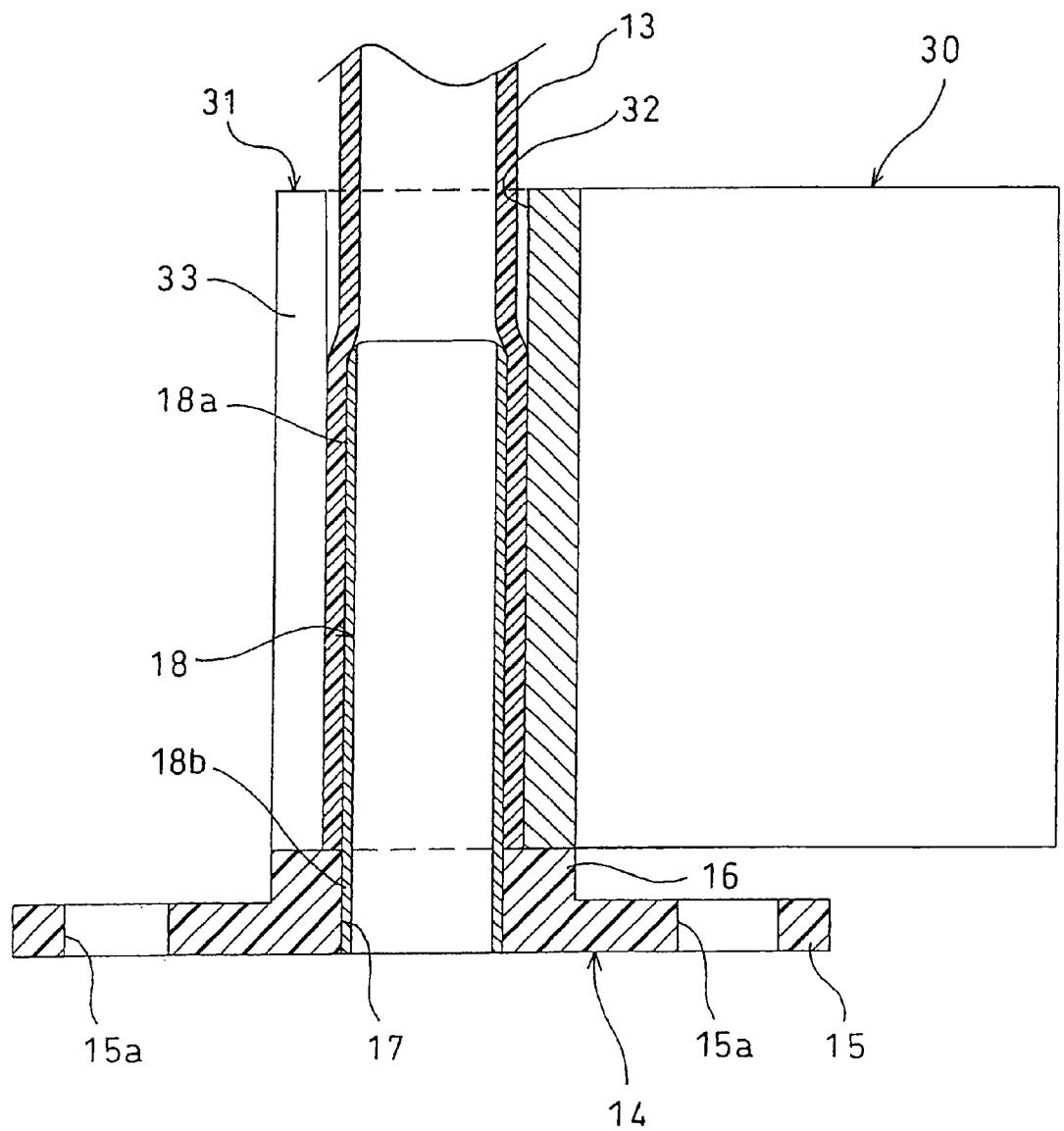
FIG. 3 is a local sectional view of the tube fixing structure according to the first aspect of the present invention.
Figure 4:
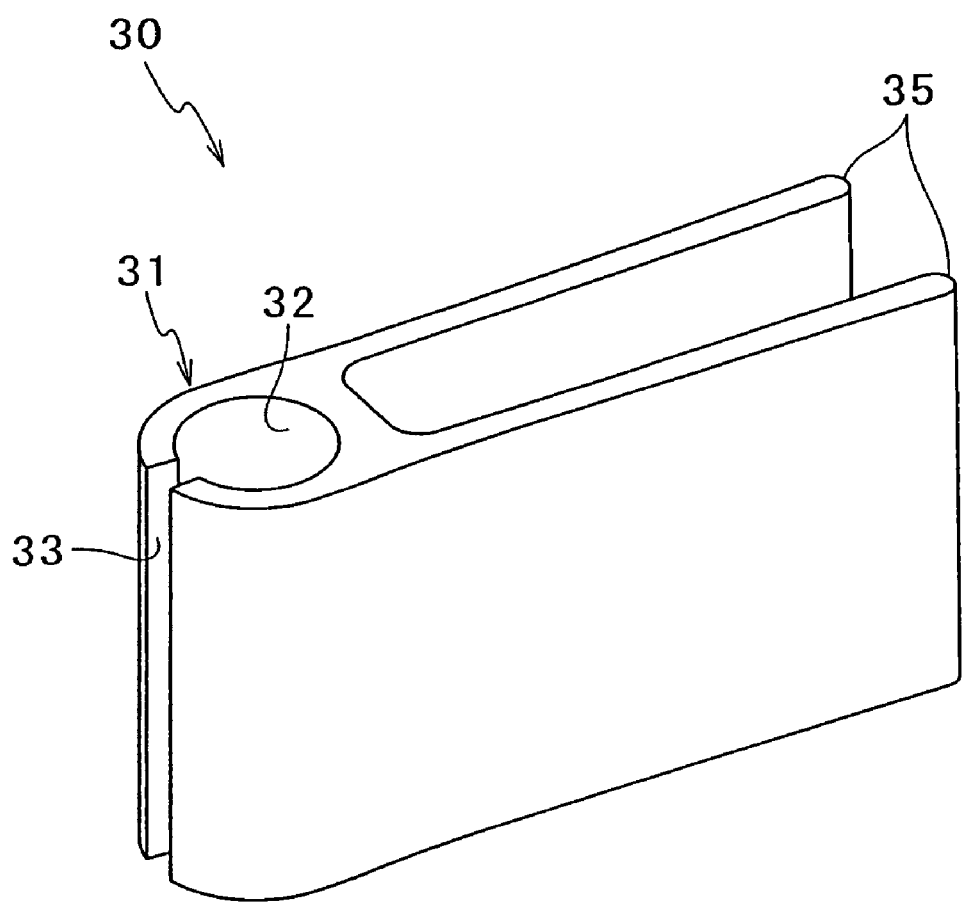
FIG. 4 is a perspective view of a fixing member illustrated in FIG. 3.

As illustrated in FIG. 4, the fixing member 30 has a substantially cylindrical holder 31, and a pair of first grippers 35 that confront each other. The holder 31 and the first grippers 35 are formed integral with each other, and are made of the POM resin similarly to the main body 15 and the protrusion 16 of the joint 14. Both of the holder 31 and the first grippers 35 have flexibility. As illustrated in FIG. 3, in addition, an axial length of the fixing member 30 is longer than a length of a part of the pipe 18 protruding from the protrusion 16.

As illustrated in FIG. 4, the holder 31 has a through hole 32 formed in its axial direction. A diameter of the through hole 32 is 3.8 mm, which is slightly smaller than the outside diameter of the tube 13 (i.e., 4 mm). The holder 31 also has a slit 33 that reaches the through hole 32. The slit 33 extends in the axial direction of the holder 31, and is formed throughout an entire length of the through hole 32.

Figure 5A:
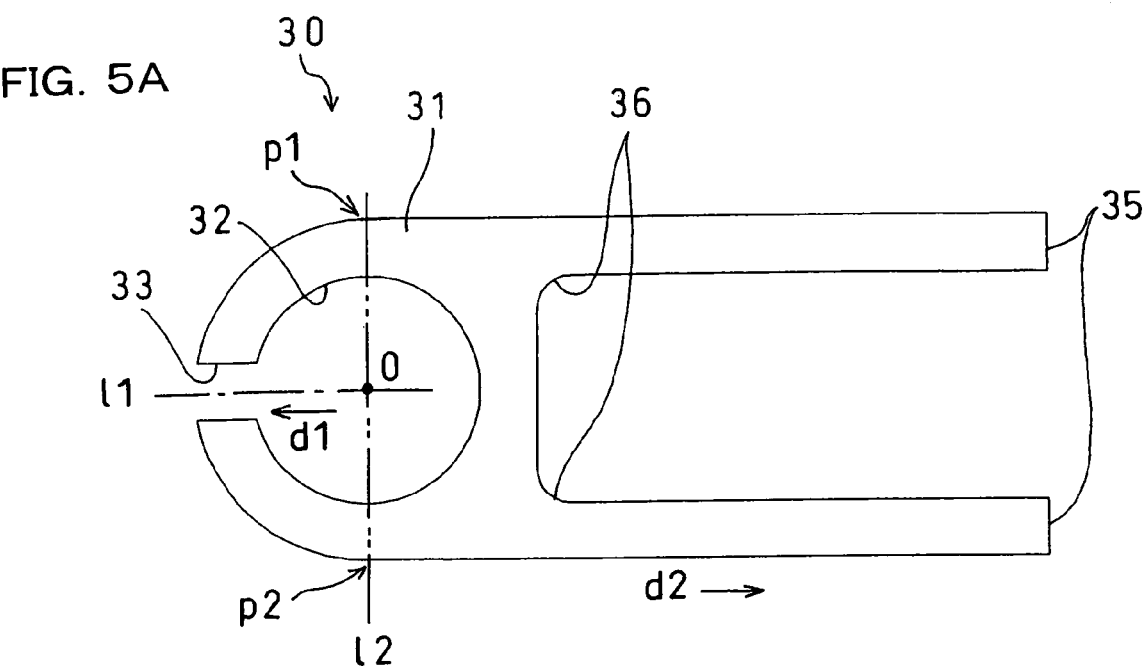
FIG. 5A is a plan view of the fixing member illustrated in FIG. 4.

As illustrated in FIG. 5A, the first grippers 35 protrude from respective portions p1 and p2 of an outer surface of the holder 31, in a direction d2 opposite to a direction d1. The portions p1 and p2 are points where the outer surface of the holder 31 intersects a line 12 that passes through a center O of the through hole 32 and extends perpendicularly to a line 11 that connects the center O with the slit 33. The direction d1 is a direction extending from the center O toward the slit 33. Boundaries between confronting sides of the respective first grippers 35 and the holder 31 have rounded corners 36.

Figure 5B:
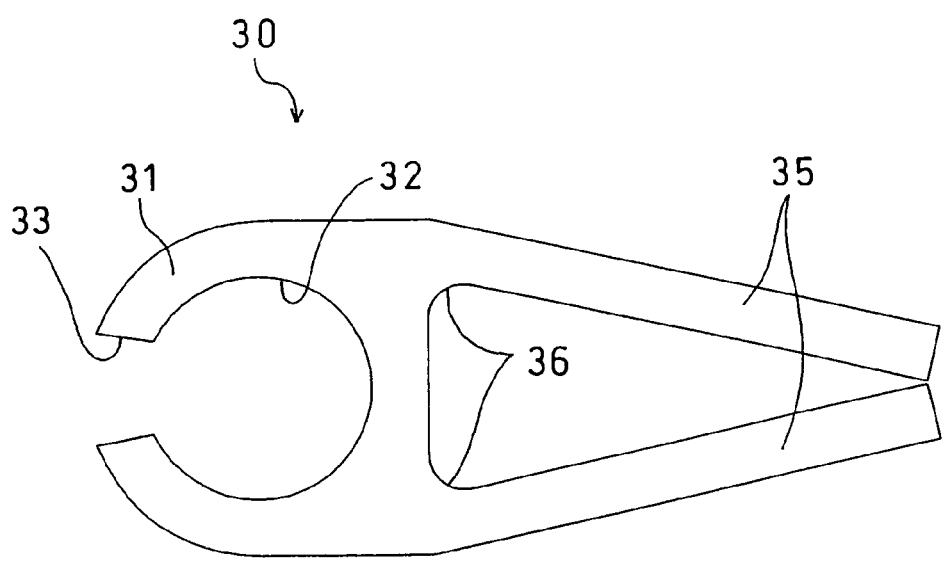
FIG. 5B is a plan view of the same fixing member as illustrated in FIG. 5A, but tips of a pair of first grippers of the fixing member are brought into contact with each other.

For attaching the fixing member 30 to the tube 13, a user grips the first grippers 35 and, as illustrated in FIG. 5B, presses them toward each other. Thereby, the first grippers 35 approach each other, and at the same time the slit 33 of the holder 31 is expanded. As a result, the through hole 32 of the holder 31 has an increased diameter. The first grippers 35 deform to be brought into contact with each other, and then deform no more.

Next, referring to FIGS. 6A, 6B, 6C, and 6D, a description will be given to a process of fixing the tube 13 to the joint 14 with the fixing member 30.

Figure 6A:
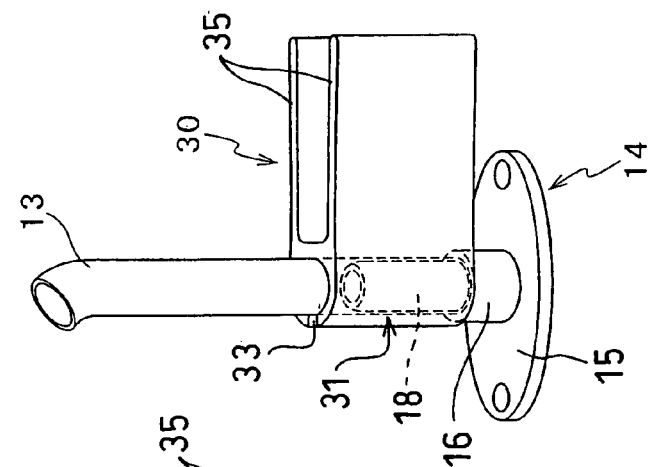
FIGS. 6A, 6B, 6C, and 6D are perspective views that show stepwisely a process of fixing the tube to a joint by means of the fixing member.
Figure 6B:
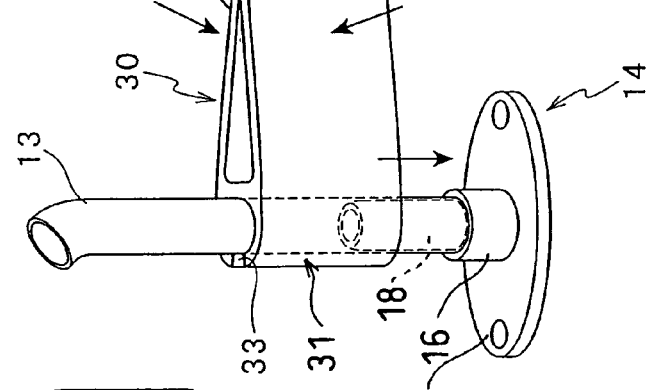

First, as illustrated in FIG. 6A, the user presses the pair of first grippers 35 toward each other (i.e., in a direction indicated by arrows in FIG. 6A), so that tips of the respective first grippers 35 are brought into contact and the slit 33 is expanded to increase the diameter of the through hole 32. Thus, the diameter of the through hole 32 becomes slightly larger than the outside diameter of the tube 13, and in this condition the tube 13 is coaxially inserted into the through hole 32. When the holder 31 is disposed at a predetermined position relative to the tube 13, the pressing against the first grippers 35 is released as illustrated in FIG. 6B. Consequently, the fixing member 30 can be fixed to a predetermined position of the tube 13. At this time, the holder 31 triggers its retaining force that tends to return the diameter of the through hole 32 to its original size, so that the tube 13 is cramped from its outer periphery and held by the holder 31.

Then, the user grips the first grippers 35 of the fixing member 30 fixed to the tube 13, and in this condition moves the first grippers 35 downward (i.e., in a direction indicated by an arrow in FIG. 6B) to insert the pipe 18 of the joint 14 into the tube 13.

Figure 6C:
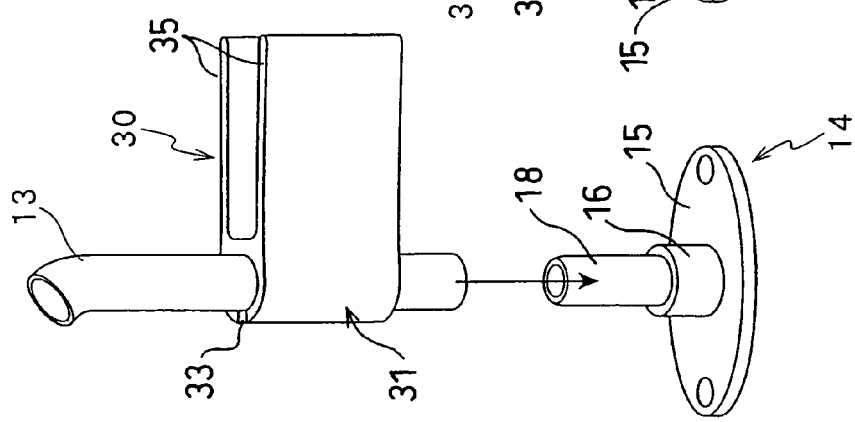

As illustrated in FIG. 6C, after the end of the tube 13 is disposed in contact with the upper face of the protrusion 16, the user again presses the first grippers 35 toward each other, to release holding power applied to the tube 13 by the holder 31. Thereby, the fixing member 30 can be slid on the outer surface of the tube 13 in the axial direction of the tube 13.

Figure 6D:
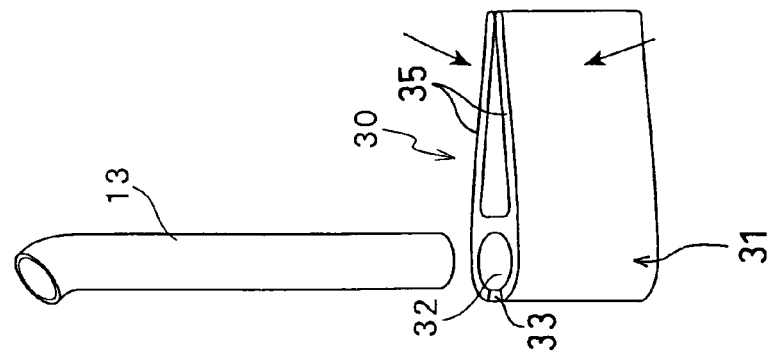

Then, the fixing member 30 is slid downward. When, as illustrated in FIG. 6D, a lower end of the holder 31 is brought into contact with the upper face of the protrusion 16, the pressing against the first grippers 35 is released. Thereby, the fixing member 30 is fixed in a predetermined position. At this time, the holder 31 is disposed to cover an upper end of the pipe 18, and in this state holds the tube 13 by its retaining force cramping the tube 13 from the outer periphery.

In order to detach the tube 13 from the joint 14, the user applies upward pultrusion to the first grippers 35 while gripping the first grippers 35, so that the tube 13 as well as the fixing member 30 can be detached from the pipe 18.

According to the tube fixing structure of this embodiment, as has been described above, the outer surface of the pipe 18 of the joint 14 is flattened with respect to the axial direction. Therefore, even when the tube 13 is a rigid one, the tube 13 exhibits no excessive deformation and thus airtightness and stability of the tube 13 can be kept well. In addition, since deformation of the tube 13 is suppressed, repetitive attachment/detachment of the tube to/from the joint 14 does not deteriorate the airtightness and stability of the tube 13. Therefore, excellent maintenability can be obtained.

Further, when the tube 13 is held by the holder 31 of the fixing member 30, the slit 33 is expanded in accordance with the rigidity of the tube 13 and then the tube 13 disposed within the through hole 32 receives appropriate cramping force. This can surely fix the tube 13 to the joint 14. When the pipe 18 of the joint 14 is merely fitted into the tube 13, the joint 14 and the tube 13 cannot surely be fixed to each other and the tube 13 may be pulled out of the pipe 18 by external force. In this embodiment, by means of the fixing member 30, the tube 13 can surely be fixed to the joint 14 as described above.

When the pipe 18 is made of a material (e.g., a resin) having a relatively high linear expansion coefficient, a rise in ambient temperature causes a large expansion of the pipe 18 so that the tube 13 having the pipe 18 fitted therein is stretched. In this embodiment, however, this problem can be relieved because the pipe 18 is made of a metal having a relatively low linear expansion coefficient. That is, even when the ambient temperature, i.e., a temperature of liquid passing through the pipe 18 or a temperature of the surroundings varies, the tube 13 hardly incurs plastic deformation.

Since, as illustrated in FIGS. 3 and 6D, the holder 31 is disposed to cover the upper end of the pipe 13, the tube 13 can be prevented from bending in the vicinity of the upper end of the pipe 18.

As illustrated in FIG. 4, the slit 33 is formed in the axial direction of the holder 31, i.e., in the axial direction of the tube 13. Since the slit 33 is in a shape of a simple straight line, it can be formed with relative ease.

Moreover, the slit 33 is formed throughout the entire length of the through hole 32, as the slit 33 can be expanded in an efficient manner. Thus, the insertion of the tube 13 into the through hole 32 of the fixing member 30 (see FIG. 6A), the sliding of the fixing member 30 (see FIG. 6C), etc., can smoothly be performed.

The fixing member 30 has the first grippers 35. Therefore, by pressing and releasing the first grippers 35, the user can easily adjust the cramping force to be applied to the tube 13 by the holder 31. Thus, the insertion of the tube 13 into the through hole 32 of the fixing member 30 (see FIG. 6A), the sliding of the fixing member 30 (see FIG. 6C), the positioning of the fixing member 30 into a predetermined position, etc., can be performed relatively easily. Further, the user can insert the tube 13 into the pipe 18 and detach it from the pipe 18 while gripping the first grippers 35. This can prevent deformation of the tube 13 which might occur when these operations are performed by grasping the tube 13 by hand. More specifically, if these operations are performed by grasping the tube 13 by hand, the tube 13 could be contracted in its radial direction and could be bent at high possibility. However, the providing of the first grippers 35 can prevent such a situation.

Besides, since the first grippers 35 and the holder 31 are formed in one piece, the cramping force applied to the tube 13 by the holder 31 can be adjusted without other members such as a spring. Therefore, there can be obtained an economical advantage as well.

The pair of first grippers 35 confronting each other can be deformed such that the tips thereof can be in contact with each other. This can prevent excessive pressing of the first grippers 35. Thus, there can be relieved the problem that the first grippers 35 are bent to an excessive extent and therefore damaged.

Boundaries between confronting sides of the respective first grippers 35 and the holder 31 have rounded corners 36. As a result, even when the first grippers are pressed toward each other as illustrated in FIG. 5B, the corners 36 hardly incur cracking. If the corners 36 are not rounded, stress would be concentrated onto the corners 36 to cause cracking thereat, and therefore the fixing member 30 might be damaged or broken.

In the following, various modifications of the fixing member will be described. The same members as described above will be denoted by common reference numerals and descriptions thereof will be omitted.

Figure 7:
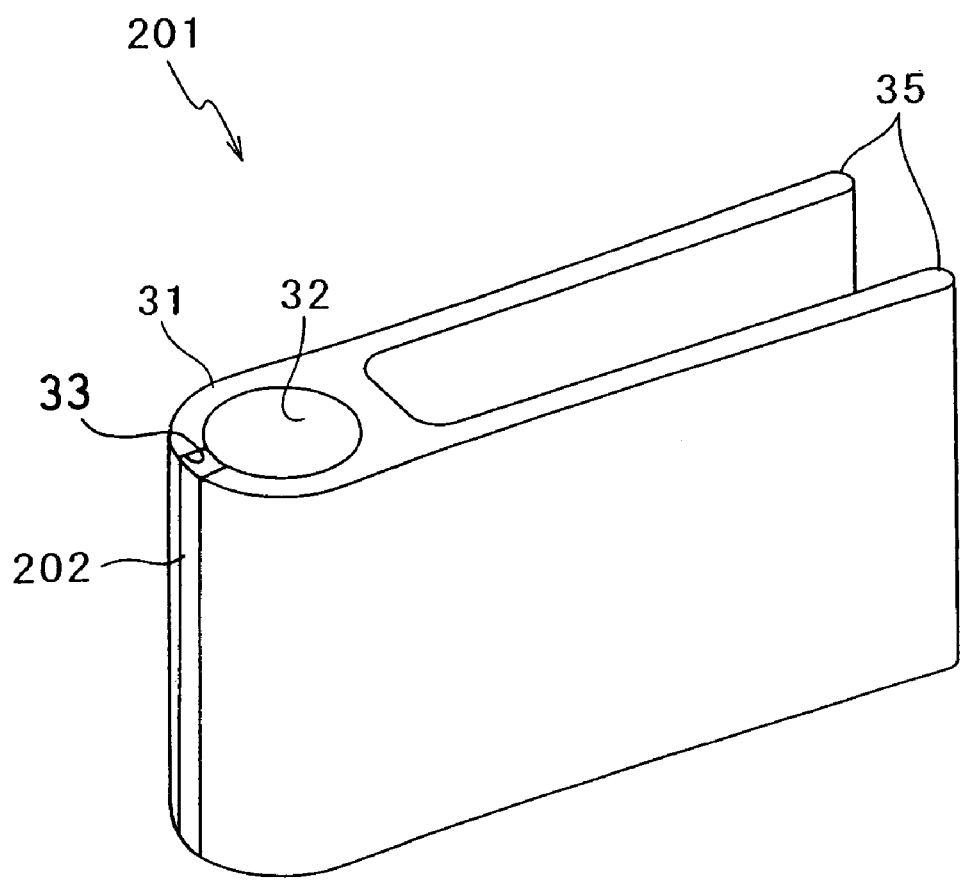
FIG. 7 is a perspective view showing a first modification of the fixing member which is applied to the tube fixing structure of the present invention.

First, referring to FIG. 7, a first modification of the fixing member will be described. A fixing member 201 of this modification differs from the above-described fixing member 30 only in that an elastic member 202 is disposed within the slit 33. The elastic member 202 is made of, e.g., a synthetic rubber or the like, and has larger elasticity than the holder 31 has. The elastic member 202 is bonded to two opposite walls of the holder 31 defining the slit 33.

By disposing the elastic member 202 within the slit 33, the aforementioned retaining force of the holder 31 is combined with retaining force of the elastic member 202, thereby producing improved holding power so that the tube 13 can surely be fixed by the joint 14.

Figure 8:
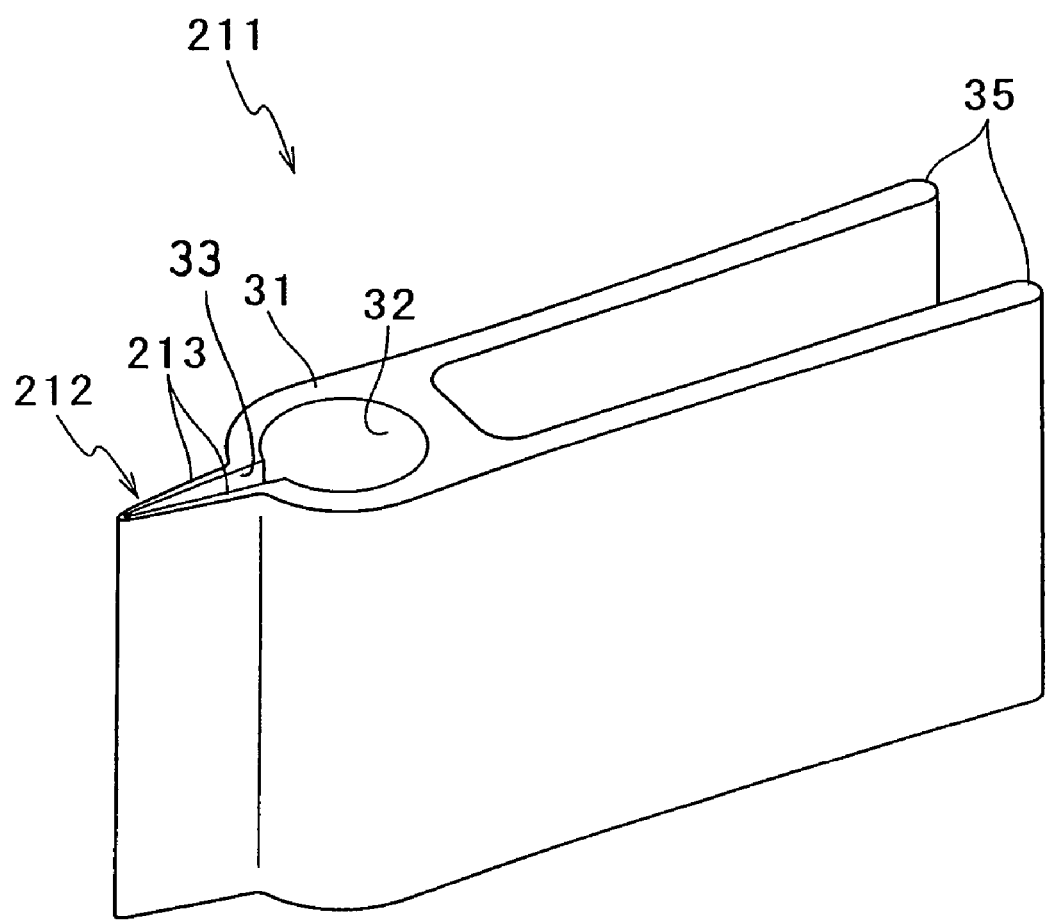
FIG. 8 is a perspective view showing a second modification of the fixing member which is applied to the tube fixing structure of the present invention.

Next, referring to FIG. 8, a second modification of the fixing member will be described. A fixing member 211 of this modification differs from the above-described fixing member 30 only in that a protrusion 212 is formed. The protrusion 212 has two extensions 213 that extend out from two opposite walls of the holder 31 which define the slit 33. The two extensions 213 extend out in a direction opposite to the protruding direction of the first grippers 35. In other words, the protrusion 212 connects the two opposite walls of the holder 31 defining the slit 33.

Since the protrusion 212 has spring characteristics, elasticity of the protrusion 212 is larger than that of the holder 31. Accordingly, similarly to the above-described first modification, the retaining force of the holder 31 is combined with retaining force of the protrusion 212, thereby producing improved holding power so that the tube 13 can surely be fixed by the joint 14.

Figure 9:
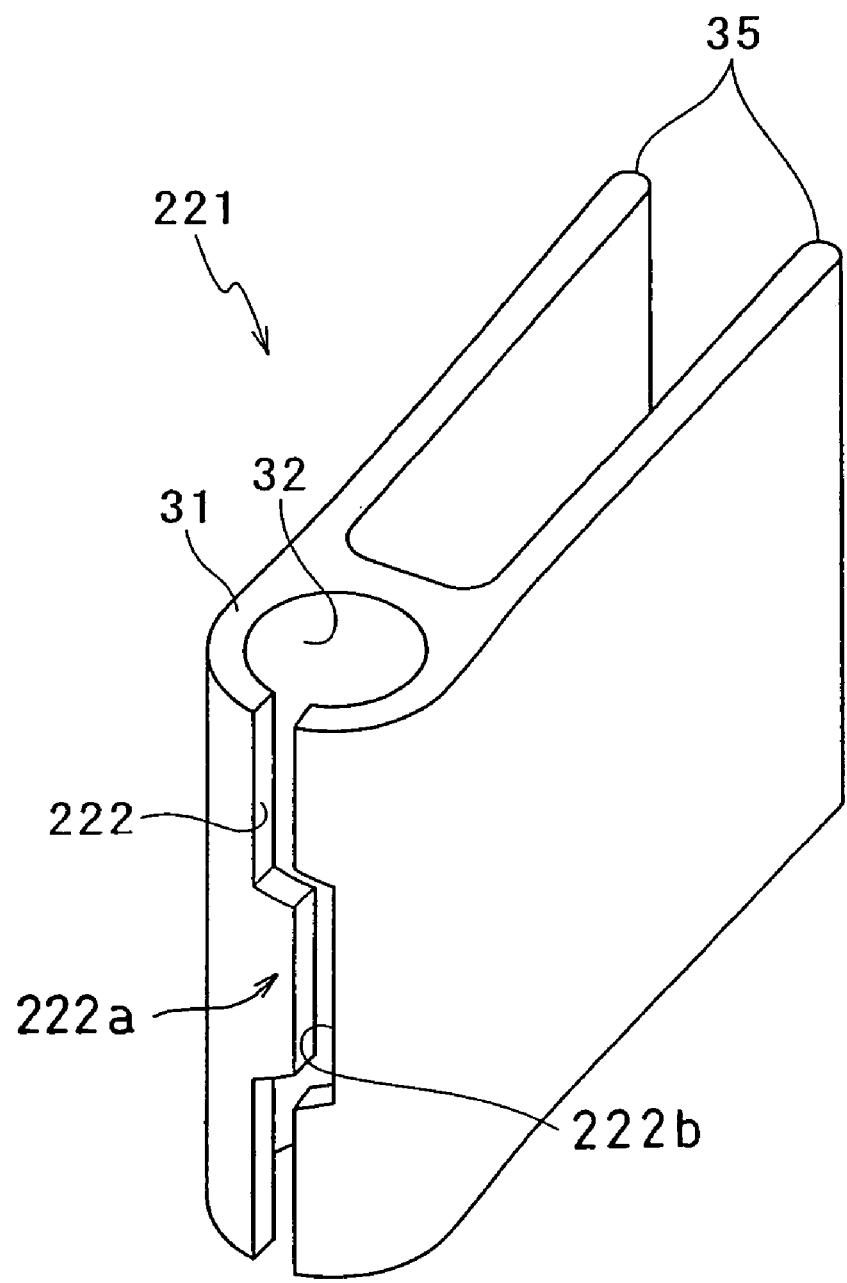
FIG. 9 is a perspective view showing a third modification of the fixing member which is applied to the tube fixing structure of the present invention.

Next, referring to FIG. 9, a third modification of the fixing member will be described. A fixing member 221 of this modification differs from the above-described fixing member 30 only in the shape of the slit formed in the holder 31. A slit 222 of this modification is shaped into a U-like form at its portion near an axial center of the holder 31. As a consequence, a protrusion 222a and a recess 222b are formed at axial centers of the respective one wall and the other wall of the holder 31 defining the slit 222. A shape of the protrusion 222a and a shape of the recess 222b are complementary to each other.

Even when such a slit 222 is formed in the holder 31, the slit 222 can be, similarly to the above-described one, expanded and restored in accordance with pressing and releasing of the first grippers 35.

Figure 10:
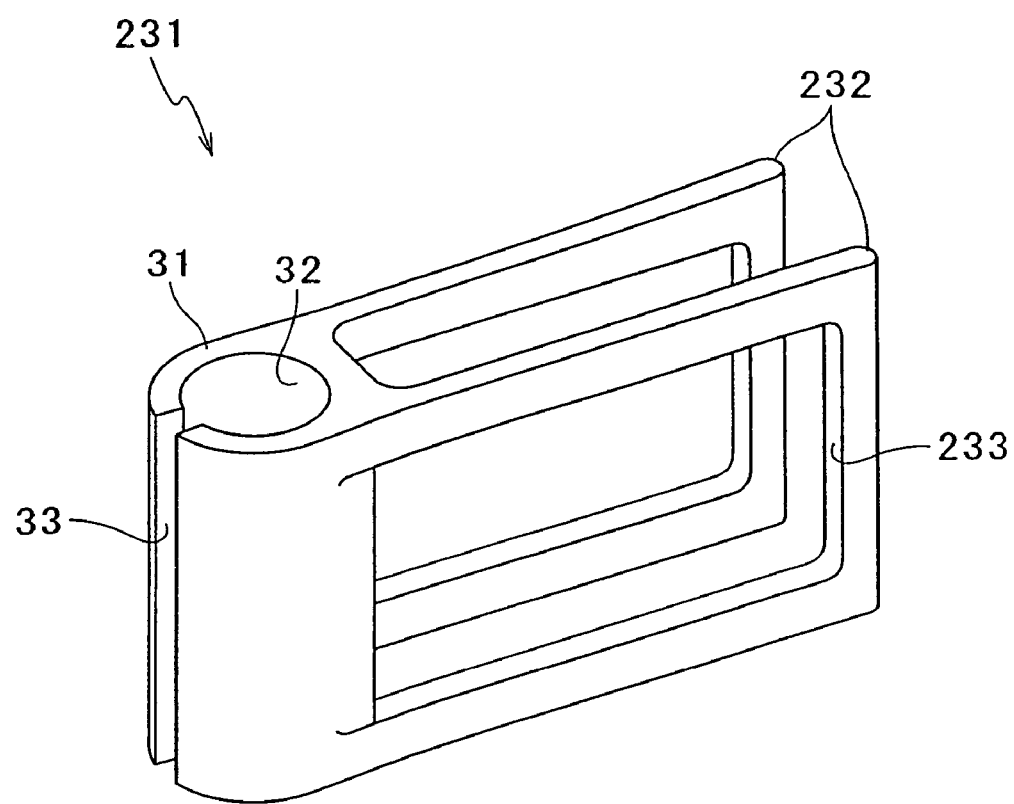
FIG. 10 is a perspective view showing a fourth modification of the fixing member which is applied to the tube fixing structure of the present invention.

Next, referring to FIG. 10, a fourth modification of the fixing member will be described. A fixing member 231 of this modification differs from the above-described fixing member 30 only in first grippers. First grippers 232 of this modification are equivalent to the above-described first grippers 35 (see FIG. 4) except that openings 233 are formed in the centers of them. The above-described first grippers 35 are connected with the holder 31 throughout its axial length, whereas the first grippers 232 of this modification have the openings 233 and therefore are connected to the holder 31 at two points, i.e., upper and lower points in the axial direction of the holder 31. A connecting portion between the first grippers 232 and the holder 31 has such a degree of strength as to press the first grippers 232 toward each other to thereby expand the slit 33.

By providing the openings 233 as in this modification, the first grippers 232 can be reduced in weight.

Figure 11:
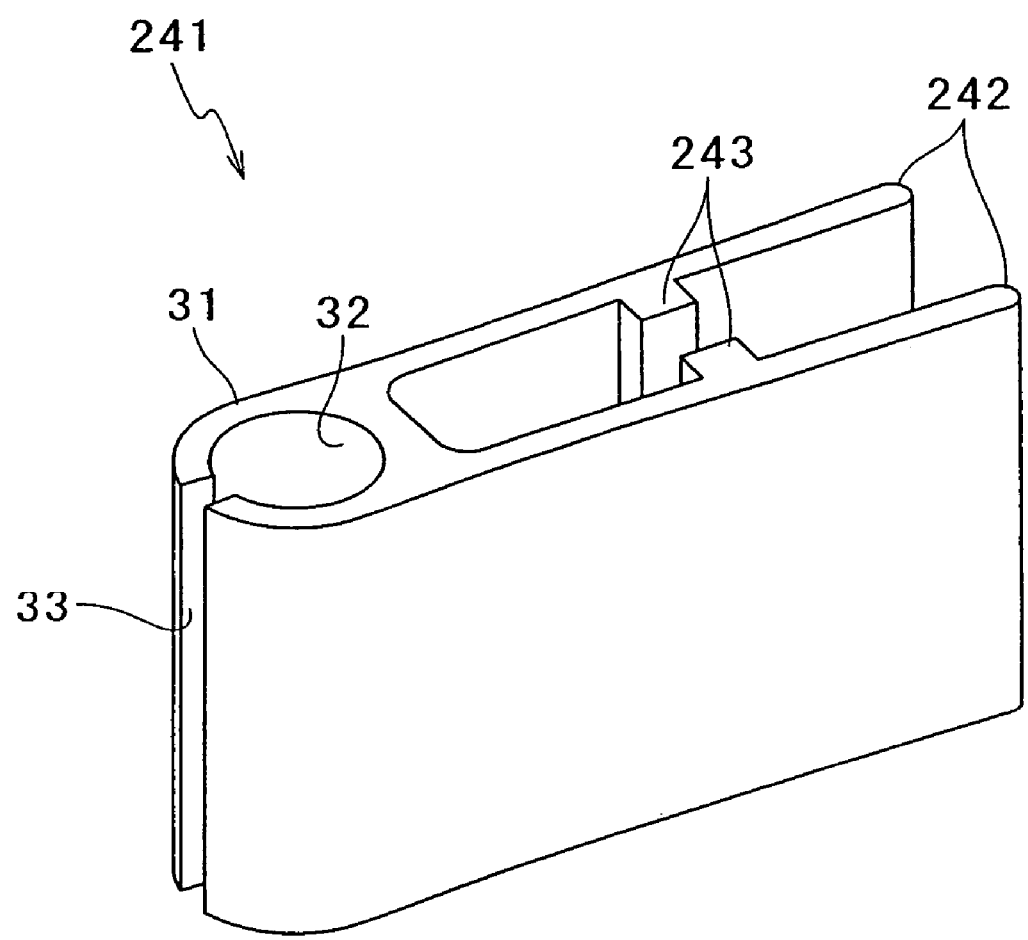
FIG. 11 is a perspective view showing a fifth modification of the fixing member which is applied to the tube fixing structure of the present invention.

Next, referring to FIG. 11, a fifth modification of the fixing member will be described. A fixing member 241 of this modification differs from the above-described fixing member 30 only in first grippers. First grippers 242 of this modification are equivalent to the above-described first grippers 35 (see FIG. 4) except that protrusions 243 protruding toward each other are provided on opposite faces of the first grippers.

When the first grippers 35 are pressed toward each other, the protrusions 243 are brought into contact with each other. In the above-described grippers 35, a contact between the tips can prevent excessive pressing, whereas, in the first grippers 243 of this modification, a contact between the protrusions 242 can prevent excessive pressing.

Figure 12:
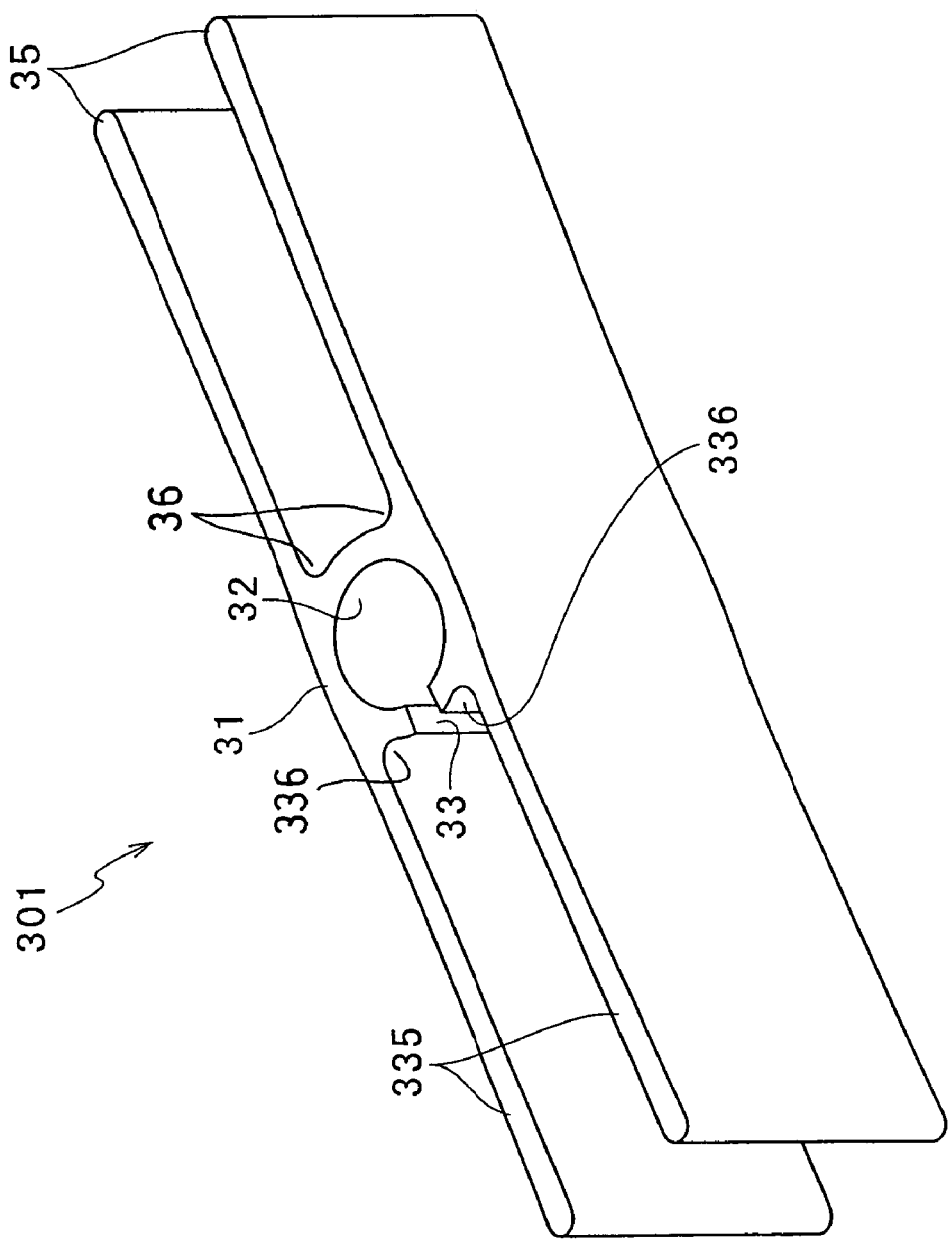
FIG. 12 is a perspective view showing a sixth modification of the fixing member which is applied to the tube fixing structure of the present invention.

Next, referring to FIGS. 12, 13, and 14, a sixth modification of the fixing member will be described. As illustrated in FIG. 12, a fixing member 301 of this modification is equivalent to the above-described fixing member 30 (see FIG. 4) except that a pair of second grippers 335 confronting each other are further provided. The second grippers 335 protrude in a direction opposite to the protruding direction of the first grippers 35, and they are formed integral with the holder 31 and the first grippers 35. Similarly to the first grippers 35, boundaries between confronting sides of the respective second grippers 335 and the holder 31 have rounded corners 336.

Here will be described a process of fixing the tube 13 to the joint 14 by means of the fixing member 301 of this modification.

First, as described above, the user presses the pair of first grippers 35 toward each other so that the tips thereof can be in contact with each other. Thus, the diameter of the through hole 32 becomes slightly larger than the outside diameter of the tube 13, and in this condition the tube 13 is coaxially inserted into the through hole 32. When the holder 31 is disposed at a predetermined position relative to the tube 13, the pressing against the first grippers 35 is released.

Figure 13:
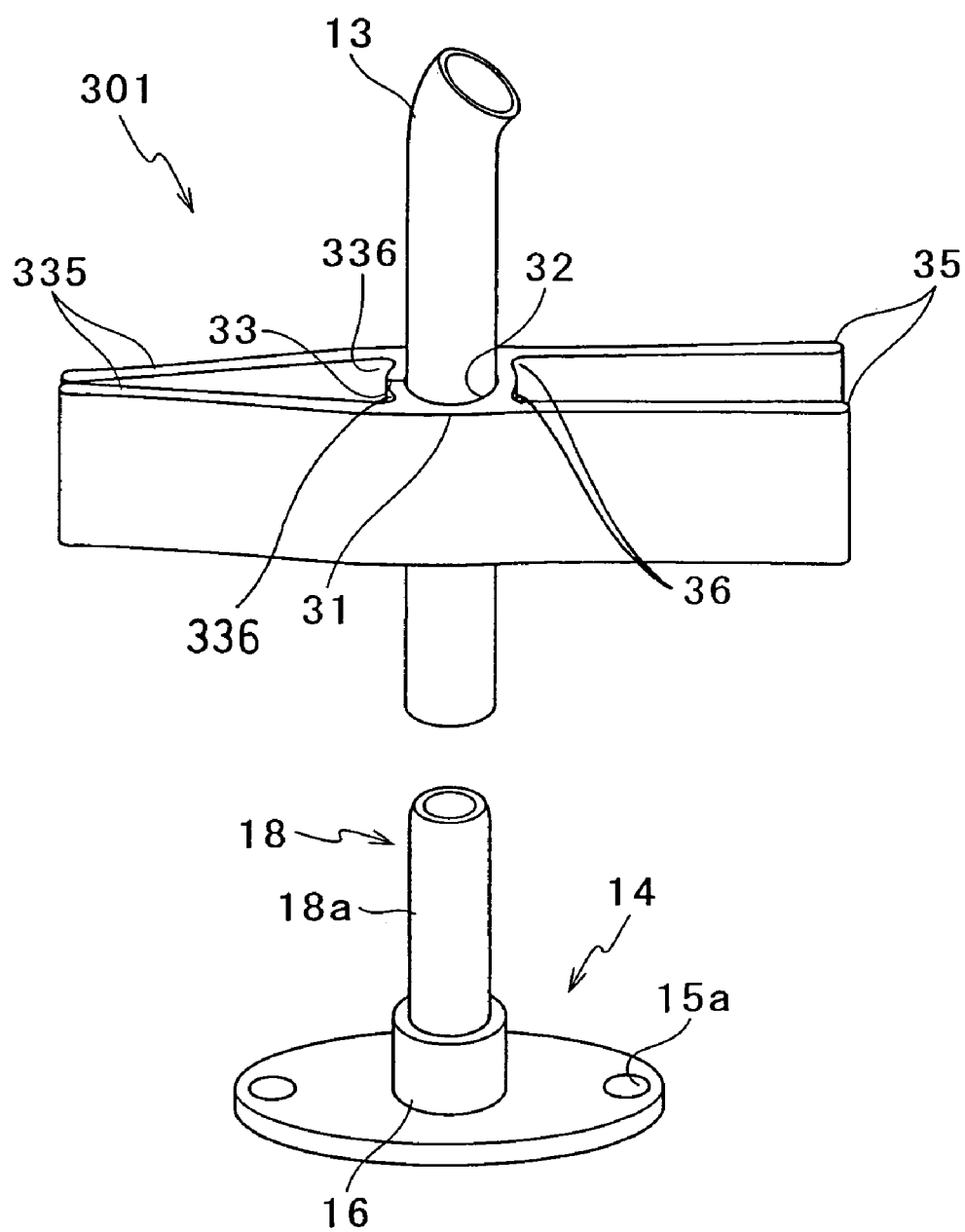
FIG. 13 is a perspective view showing that a tube to which the fixing member of FIG. 12 is attached is disposed above the joint.

At this time, as illustrated in FIG. 13, the user further presses the pair of second grippers 335 toward each other so that tips thereof can be in contact with each other. Thus, the diameter of the through hole 32 is decreased. Thereby, the fixing member 301 can be fixed to a predetermined position of the tube 13.

Then, the user grips the second grippers 335 of the fixing member 301 fixed to the tube 13 with the tips of the second grippers 335 being in contact with each other, and in this condition moves the second grippers 335 downward, to insert the pipe 18 of the joint 14 into the tube 13.

Figure 14:
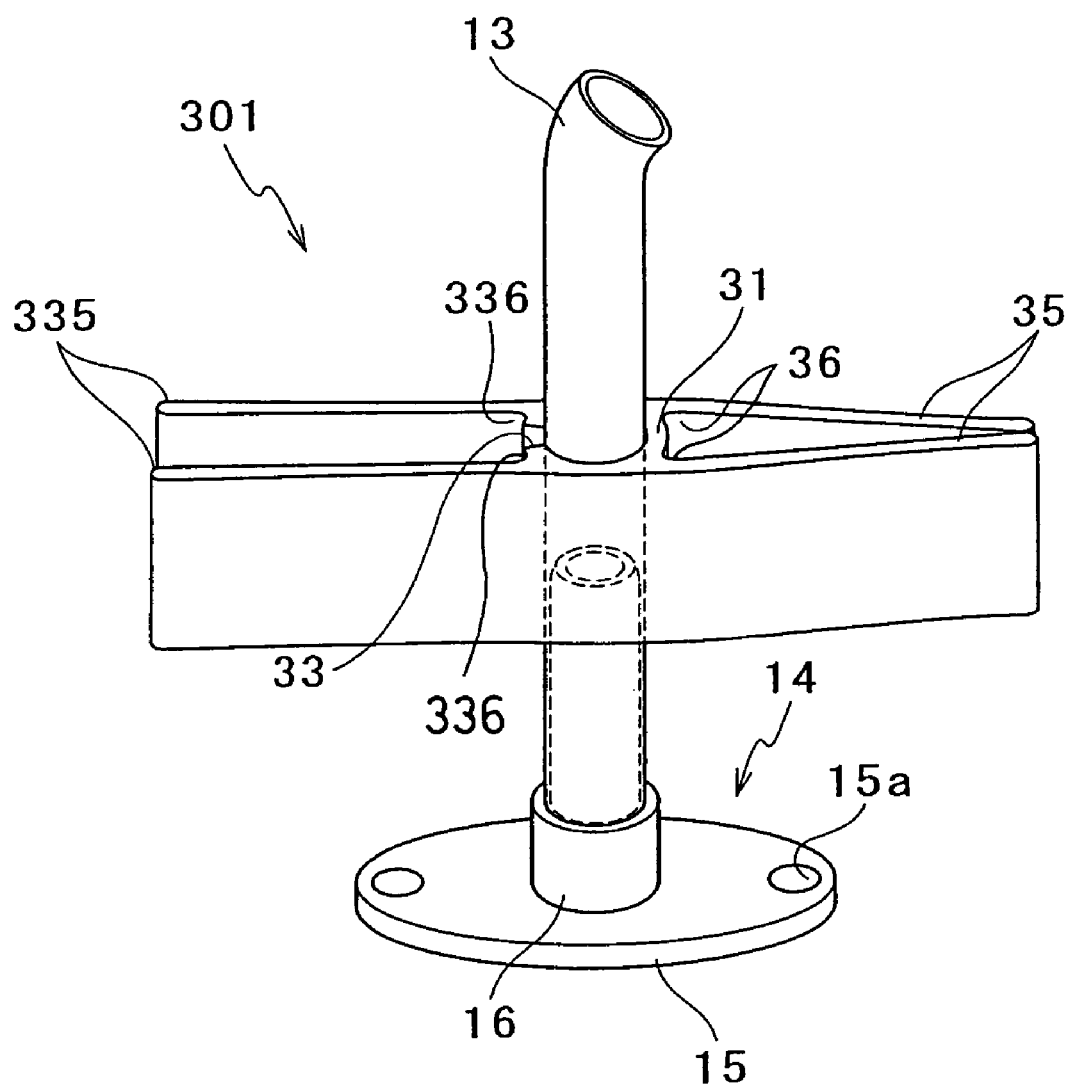
FIG. 14 is a perspective view showing that a pipe of the joint is inserted into a tube to which the fixing member of FIG. 12 is attached.

As illustrated in FIG. 14, after the end of the tube 13 is disposed in contact with the upper face of the protrusion 16, the user releases the pressing against the second grippers 335 and again presses the first grippers 35 toward each other. Thereby, the slit 33 is expanded to increase the diameter of the through hole 32, so that the holding power applied to the tube 13 by the holder 31 is released. Accordingly, the fixing member 301 can be slid on the outer surface of the tube 13 in the axial direction of the tube 13.

Then, the fixing member 301 is slid downward. When a lower end of the holder 31 is brought into contact with the upper face of the protrusion 16, the pressing against the first grippers 35 is released. Thereby, the fixing member 301 is fixed in a predetermined position. At this time, the holder 31 triggers its retaining force that tends to return the diameter of the through hole 32 to its original size, so that the tube 13 is cramped from its outer periphery and held by the holder 31.

In order to detach the tube 13 from the joint 14, the user presses the second grippers 335 toward each other to increase the holding power of the holder 31. In this condition, the user applies upward pultrusion to the second grippers 335 while gripping the second grippers 335. Thereby, the tube 13 as well as the fixing member 30 can be detached from the pipe 18.

As has been described above, according to this modification, the holding power applied to the tube 13 by the holder 31 can be improved by pressing the second grippers 335. Accordingly, the tube 13 can surely be fixed by the joint 14.

Further, the user can insert the tube 13 into the pipe 18 and detach it from the pipe 18 while gripping the second grippers 335. This can prevent deformation of the tube 13 which might occur when these operations are performed by grasping the tube 13 by hand.

Moreover, the holding power of the holder 31 produced by pressing the second grippers 335 is kept improved during insertion of the tube 13 into the pipe 18 and detachment of the tube 13 from the pipe 18. Therefore, these operations can be performed in an efficient manner. This is because improved holding power of the holder 31 makes it difficult to cause slipping between the outer surface of the tube 13 and the inner surface of the holder 31, thereby transmitting insertion force or pulling force in an efficient manner. Therefore, even when the pipe 18 cannot easily be fitted into the tube 13 due to, e.g., friction between the inner surface of the tube 13 and the outer surface of the pipe 18, it can appropriately be fitted into the tube 13.

Besides, since the second grippers 335 are formed integral with the holder 31 and the first grippers 35, the cramping force applied to the tube 13 by the holder 31 can be adjusted without other members. Therefore, there can be obtained an economical advantage as well.

Figure 15:
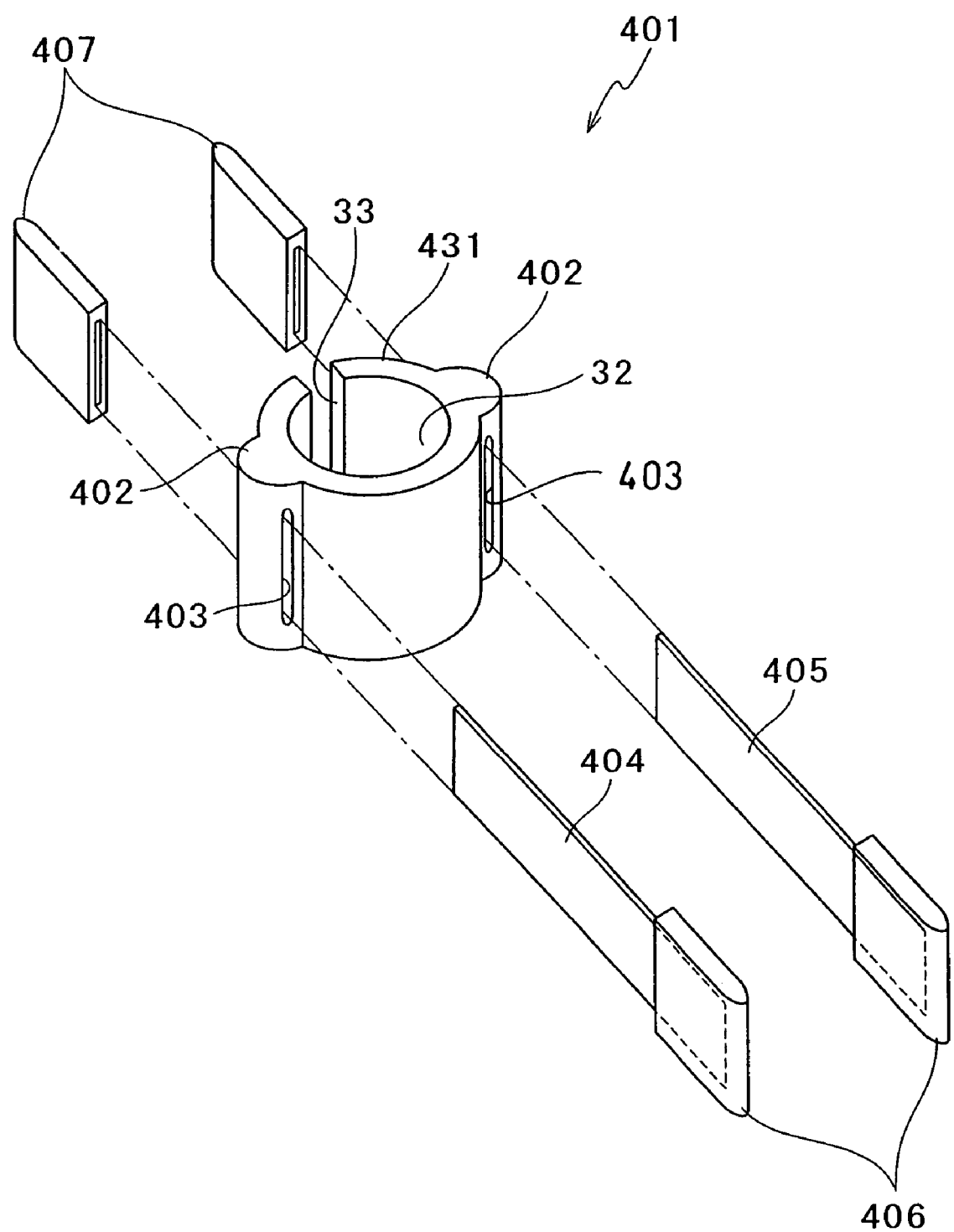
FIG. 15 is a perspective view showing a seventh modification of the fixing member which is applied to the tube fixing structure of the present invention.

Next, referring to FIG. 15, a seventh modification of the fixing member will be described.

A fixing member 401 of this modification includes a holder 431 having a through hole 32 and a slit 33, and a pair of protrusions 402 protruding from the holder 431.

Each protrusion 402 protrudes outward from a portion of an outer surface of the holder 431. The portion is a point where the outer surface of the holder 431 intersects the line that passes through the center O of the through hole 32 and extends perpendicularly to the line that connects the center O with the slit 33. Each protrusion 402 has a semicylindrical shape, and is formed throughout an entire axial length of the holder 431. Each protrusion 402 has an insertion hole 403 formed therethrough in a direction along the line connecting the center O with the slit 33. The insertion hole 403 has a substantially rectangular sectional shape.

The fixing member 401 further includes plate members 404 and 405, and covers 406 and 407. The plate members 404 and 405 are slidably inserted into the insertion holes 403 of the respective protrusions 402. The covers 406 and 407 are detachably attached to respective ends of the plate members 404 and 405 in their sliding direction.

The plate members 404 and 405 are made of an elastic material such as spring steels, and slidable into the insertion holes 403. The plate members 404 and 405 as inserted into the through holes 403 can be bent around the insertion hole 403 serving as a supporting point. Each of the covers 406 and 407 has such a size as to be impassable through the through hole 403, that is, has a section larger than a section of the through hole 403.

In this modification, the covers 406 are attached to one end of the plate members 404 and 405, and in this state the plate members 404 and 405 are inserted into the through holes 403 from the other ends thereof. Then, the other ends of the plate members 404 and 405 are extended from the protrusions 402 in their insertion direction, and the cover 407 are attached to the other ends. Since the covers 406 and 407 cannot pass through the insertion holes 403, the plate members 404 and 405 are not pulled out of the insertion holes 403 and are held in predetermined positions. The provision of the covers 406 and 407 can prevent the plate members 404 and 405 from erroneously being pulled out of the insertion holes 403.

After the tube 13 is fixed to the joint 14 by means of the fixing member 401, the plate members 404 and 405 are removed from the holder 431. Thus, only the holder 431 remains and compactification of the fixing member can be realized.

Moreover, by pressing a confronting pair of covers 406 toward each other with the plate members 404 and 405 and the covers 406 and 407 being mounted in the aforementioned manner, the slit 33 can be expanded to increase a diameter of the through hole 32. In addition, by pressing a confronting pair of covers 407 toward each other, the slit 33 can be narrowed to decrease the diameter of the through hole 32. That is, holding power of the holder 431 can be adjusted in substantially the same manner as in the above-described sixth modification.

Figure 16:
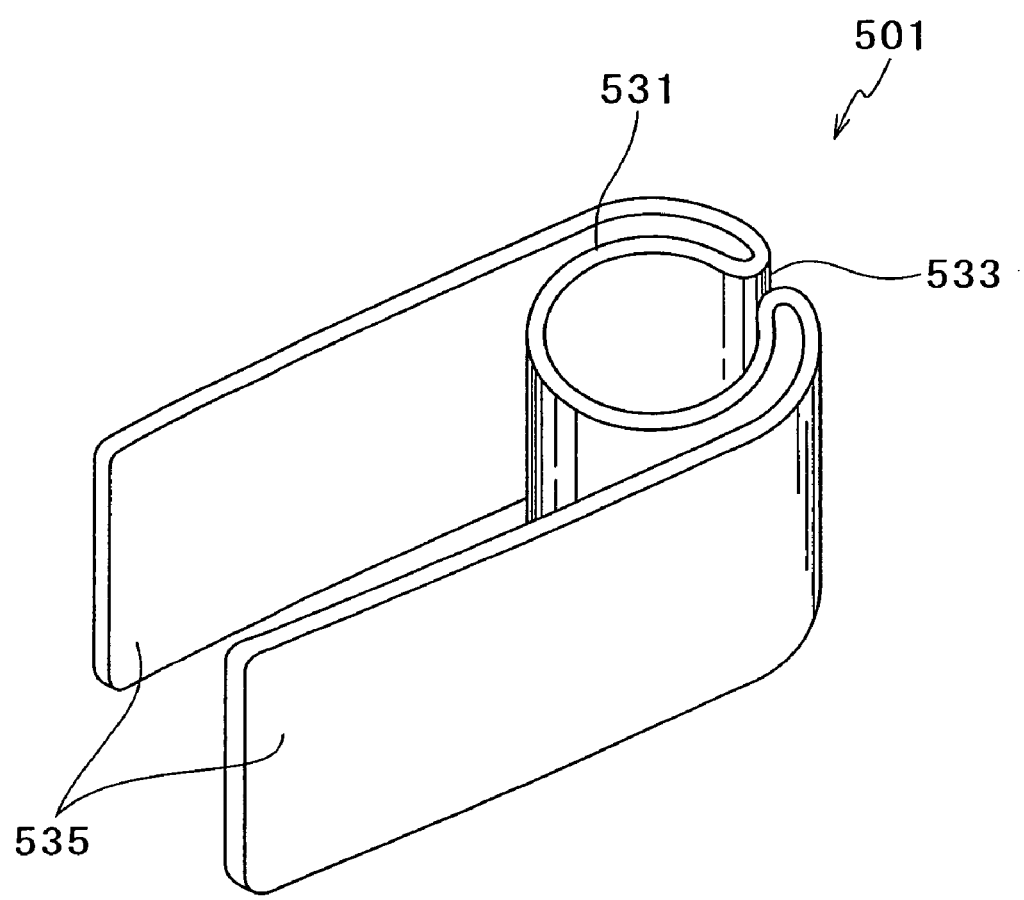
FIG. 16 is a perspective view showing an eighth modification of the fixing member which is applied to the tube fixing structure of the present invention.

Next, referring to FIG. 16, an eighth modification of the fixing member will be described. A fixing member 501 of this modification is obtained by forming a single elongated plate made of a spring steel into substantially the same shape as that of the above-described fixing member 30.

By bending the elongated plate into a cylindrical shape, a holder 531 having the same shape as that of the above-described holder 31 is formed. A slit 533 similar to the above-described slit 33 is formed at a turned portion of the plate. The turned portion turned up at the portion constituting the slit 533 constitutes first grippers 535 that are similar to those of the above-described first grippers 35. The first grippers 535 are formed along a peripheral surface of the holder 531 from the portion constituting the slit 533 to portions of the holder 531. These portions are points where the holder 531 intersects a line that passes through a center of the holder 531 and extends perpendicularly to a line that connects the center with the slit 533. From these portions, the first grippers 535 protrude toward a direction opposite to a direction extending from the center of the holder 531 toward the slit 533.

Since the fixing member 501 of this modification is formed of a single plate made of a spring steel, retaining force of the holder 531 can be improved as compared with that of the holder 31. Accordingly, the tube 13 can surely be fixed by the joint 14.

The pipe 18 in the above-described embodiment has a constant inside diameter and a constant outside diameter throughout its entire length. However, this is not limitative. For example, the outside diameter of the pipe can be gradually reduced toward one end thereof that is fitted into the tube 13. In this case as well, there can be obtained the same effects as described above, i.e., the effects that the tube exhibits no excessive deformation and thus airtightness and stability of the tube can be kept well and that repetitive attachment/detachment of the tube does not deteriorate the airtightness and stability of the tube, as long as the following formula is satisfied:

$$(\phi 2 - \phi 1)/\phi 2 \leq 0.1$$

where $\phi 1$ represents an outside diameter of the one end of the pipe; and $\phi 2$ represents an outside diameter of the other end of the pipe.

How to attach/detach the tube 13 to/from the joint 14 is not limited to the above-described one, but may be various ones.

The pipe 18 may be made of various kinds of metal, and may be made even of a resin, as long as the resin has a low linear expansion coefficient and excellent thermal stability and therefore the shape is hardly deformed.

It is not always required that the tips of the pair of first grippers 35 and the tips of the pair of second grippers 335 are in contact with each other. It suffices that they are deformable in such a manner that they can be partially in contact with each other.

The first and second grippers 35 and 335 can be omitted from the fixing member, which may have the holder alone.

The holder of the fixing member may have various configurations as long as the holder has a slit and a diameter of a through hole can be increased.

An application of the present invention is not limited to line-type ink-jet printers. The present invention is universally applicable to apparatuses in which a tube is fixed to a joint, such as serial-type ink-jet printers, ink-jet type facsimile machines or copying machines.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A tube fixing structure in which a tube is fixed to a joint by means of a fixing member, the tube fixing structure comprising:

a pipe having a first terminal end and a second terminal end, the first terminal end being fitted into the tube; and a main body that is connected with the second terminal end of the pipe and includes a protruding portion which protrudes in an axial direction, contacts an end of the tube and covers a portion of the pipe; and the fixing member comprising a cylindrical holder made of a flexible material, which cramps a portion of the tube, the holder having a through hole into which the tube is coaxially disposed and a slit formed to reach the through hole;

wherein the holder is disposed to cover, from an outside of the tube, the first terminal end of the pipe, and an area on the outer surface of the pipe, which area is covered by the holder, is made smooth.

2. The tube fixing structure according to claim 1, wherein the pipe is made of a metal.

3. The tube fixing structure according to claim 1, wherein the outside diameter of the pipe is gradually decreasing toward the first terminal end thereof, the structure satisfying the following formula:

$$(\phi 2 - \phi 1)/\phi 2 \leq 0.1$$

where $\phi 1$ represents an outside diameter of the first terminal end of the pipe; and $\phi 2$ represents an outside diameter of the second terminal end of the pipe.

4. The tube fixing structure according to claim 1, wherein the slit of the fixing member is formed along an axial direction of the tube.

5. The tube fixing structure according to claim 1, wherein the slit of the fixing member is formed throughout an entire length of the through hole.

6. The tube fixing structure according to claim 1, wherein the fixing member further comprises a plurality of first grippers protruding, from portions where an outer surface of the holder intersects a line that passes through a center of the through hole and extends perpendicularly to a line that connects the slit with the center of the through hole, in a direction opposite to a direction extending from the center of the through hole to the slit, wherein confronting sides of the slit are spaced apart when the fixing member is in a normal state.

7. The tube fixing structure according to claim 6, wherein the first grippers are formed integral with the holder.

8. The tube fixing structure according to claim 6, further comprising a plurality of second grippers protruding, from portions where the outer surface of the holder intersects the line that passes through the center of the through hole and extends perpendicularly to the line that connects the slit with the center of the through hole, in the direction extending from the center of the through hole to the slit.

9. The tube fixing structure according to claim 8, wherein the second grippers are formed integral with the holder and the first grippers.

10. The tube fixing structure according to claim 6, wherein a confronting pair of the plurality of first grippers are deformable in such a manner that they can be partially in contact with each other.

11. The tube fixing structure according to claim 6, wherein boundaries between the holder and confronting sides of a confronting pair of the plurality of first grippers have rounded corners.

12. The tube fixing structure according to claim 1, further comprising:
   a plurality of protrusions protruding outward from such portions of an outer surface of the holder as to intersect a line that passes through a center of the through hole and extends perpendicularly to a line that connects the slit with the center of the through hole, the protrusions being formed integral with the holder;
   insertion holes formed throughout the respective protrusions along a direction of the line that connects the slit with the center of the through hole; and
   elastic plates that are slidably inserted into the insertion holes.

13. The tube fixing structure according to claim 12, further comprising covers that are detachably attached to respective end of the plates with respect to a sliding direction of the plates, each of the covers has such a size as to be impassable through the through hole.

14. The tube fixing structure according to claim 1, wherein the fixing member further comprises an elastic member that is disposed to connect two opposite wall faces of the holder defining the slit, the elastic member having a larger elasticity than that of the holder.

15. The tube fixing structure according to claim 1, wherein the through hole of the holder is longer than a length from the first terminal end of the pipe to a portion of the pipe protruding from the main body with respect to the axial direction.

* * * * *